(12) United States Patent
Krasner et al.

(10) Patent No.: US 11,119,803 B2
(45) Date of Patent: Sep. 14, 2021

(54) METHOD AND SYSTEM FOR OFFLOADING PARITY PROCESSING

(71) Applicant: EMC IP Holding Company LLC, Hopkinton, MA (US)

(72) Inventors: Jonathan I. Krasner, Coventry, RI (US); Steven R. Chalmer, Redwood City, CA (US); Chakib Ourraoui, Watertown, MA (US); Sweetesh Singh, Benares (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 132 days.

(21) Appl. No.: 16/400,937

(22) Filed: May 1, 2019

(65) Prior Publication Data
US 2020/0348958 A1 Nov. 5, 2020

(51) Int. Cl.
| | | |
|---|---|---|
| *G06F 9/455* | (2018.01) | |
| *G06F 9/445* | (2018.01) | |
| *G06T 1/20* | (2006.01) | |
| *G06F 9/50* | (2006.01) | |
| *G06F 11/30* | (2006.01) | |

(52) U.S. Cl.
CPC ...... *G06F 9/45558* (2013.01); *G06F 9/44563* (2013.01); *G06F 9/44594* (2013.01); *G06F 9/505* (2013.01); *G06T 1/20* (2013.01); *G06F 11/3051* (2013.01); *G06F 11/3055* (2013.01); *G06F 2009/45583* (2013.01); *G06F 2009/45591* (2013.01)

(58) Field of Classification Search
None
See application file for complete search history.

(56) References Cited

U.S. PATENT DOCUMENTS

| | | | | |
|---|---|---|---|---|
| 7,284,119 | B2* | 10/2007 | Hyder | G06F 9/5027 709/203 |
| 7,656,894 | B2* | 2/2010 | Dube | G06F 9/5044 370/463 |
| 9,477,466 | B2* | 10/2016 | Nishimoto | G06F 9/3001 |
| 9,529,620 | B1* | 12/2016 | Dow | G06F 9/455 |
| 10,353,722 | B2* | 7/2019 | Karino | H04L 63/0485 |
| 2003/0084435 | A1* | 5/2003 | Messer | G06F 9/505 717/174 |
| 2006/0098018 | A1 | 5/2006 | Tarditi, Jr. | |
| 2011/0154334 | A1* | 6/2011 | Beale | G06F 9/5027 718/100 |
| 2012/0110346 | A1 | 5/2012 | Resch | |
| 2014/0189039 | A1* | 7/2014 | Dalton | G06F 15/17331 709/213 |
| 2015/0154111 | A1* | 6/2015 | D'Abreu | G06F 12/0246 714/6.11 |

(Continued)

*Primary Examiner* — Abu Zar Ghaffari
(74) *Attorney, Agent, or Firm* — Chamberlain, Hrdlicka, White, Williams & Aughtry

(57) ABSTRACT

A method for processing data includes monitoring, by a virtual machine (VM), a plurality of computing resources, receiving an offload request by the VM, selecting, based on the monitoring, a computing resource from the plurality of computing resources, issuing, by the VM and in response to the offload request, the processing request to the computing resource, and servicing, by the computing resource, the processing request to obtain a result, wherein the VM and the computing resource are executing on a computing device.

7 Claims, 5 Drawing Sheets

(56) References Cited

U.S. PATENT DOCUMENTS

| | | | |
|---|---|---|---|
| 2016/0164962 A1* | 6/2016 | Ghosh | H04L 67/1008 |
| | | | 709/223 |
| 2016/0344844 A1* | 11/2016 | Lin | H04L 67/10 |
| 2017/0085636 A1* | 3/2017 | Lin | H04L 67/1031 |
| 2017/0289059 A1* | 10/2017 | Wu | H04L 67/2838 |
| 2018/0046385 A1 | 2/2018 | Altaparmakov | |
| 2018/0341549 A1* | 11/2018 | Bolkhovitin | G06F 11/1068 |
| 2019/0098367 A1* | 3/2019 | Jung | H04N 21/6131 |
| 2019/0171485 A1* | 6/2019 | Bolkhovitin | G06F 9/50 |
| 2020/0334184 A1* | 10/2020 | Suresh | G06F 13/4282 |

\* cited by examiner

METHOD AND SYSTEM FOR OFFLOADING PARITY PROCESSING

BACKGROUND

Computing devices may include any number of internal components such as processors, memory, and persistent storage. As the number of internal components in a computing device increases, the complexity of efficiently using all of the internal components also increases. As a result, the internal components in a computing device are often not utilized in the most efficient manner, e.g., to maximize the performance of the computing device.

SUMMARY

In general, in one aspect, the invention relates to a method for processing data. The method includes monitoring, by a virtual machine (VM), a plurality of computing resources, receiving an offload request by the VM, selecting, based on the monitoring, a computing resource from the plurality of computing resources, issuing, by the VM and in response to the offload request, the processing request to the computing resource, and servicing, by the computing resource, the processing request to obtain a result, wherein the VM and the computing resource are executing on a computing device.

In one aspect, a non-transitory computer readable medium in accordance with one or more embodiments of the invention includes computer readable program code, which when executed by a computer processor enables the computer processor to perform a method for processing data. The method includes monitoring, by a virtual machine (VM), a plurality of computing resources, receiving an offload request by the VM, selecting, based on the monitoring, a computing resource from the plurality of computing resources, issuing, by the VM and in response to the offload request, the processing request to the computing resource, and servicing, by the computing resource, the processing request to obtain a result, wherein the VM and the computing resource are executing on a computing device.

In one aspect, a system in accordance with one or more embodiments of the invention includes a processor, a plurality of computing resources, and memory which includes instructions, which when executed by the processor, perform a method for processing data. The method includes monitoring, by a virtual machine (VM), a plurality of computing resources, receiving an offload request by the VM, selecting, based on the monitoring, a computing resource from the plurality of computing resources, issuing, by the VM and in response to the offload request, the processing request to the computing resource, and servicing, by the computing resource, the processing request to obtain a result, wherein the VM and the computing resource are executing on a computing device.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing data storage. More specifically, embodiments of the invention relate to a method for a host operating system of a host computing device to offload the calculation of parity values to graphics processing units (GPUs). The GPUs, by having a larger number of cores than a processor used by the host operating system, may be better equipped to efficiently handle the large amount of computation required to perform the parity calculations. Embodiments of the invention may determine whether to offload the request to perform the calculations and allow a specialized VM with direct communication to the GPU(s) to perform the parity calculations.

Figure 1:
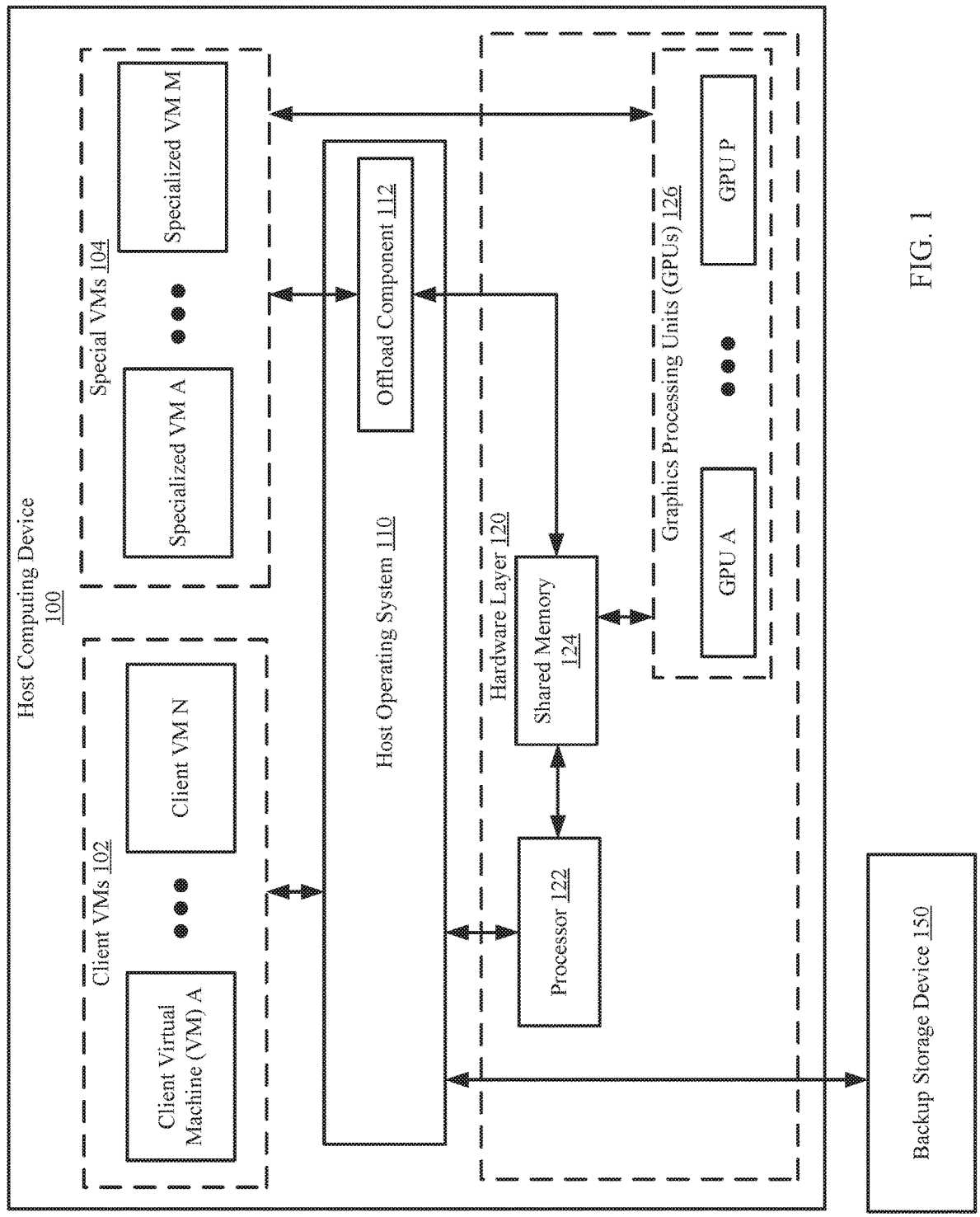
FIG. 1 shows a diagram of a system in accordance with one or more embodiments of the invention.

FIG. 1 shows an example system in accordance with one or more embodiments of the invention. The system includes a host computing device (100) and a backup storage device (150). The system may include additional, fewer, and/or different components without departing from the invention. Each component may be operably connected via any combination of wired and/or wireless connections. Each component illustrated in FIG. 1 is discussed below.

In one or more embodiments of the invention, the host computing device (100) hosts any number of client virtual machines (VMs) (102). The client VMs (102) may be logical entities executed using computing resources (e.g., components of a hardware layer (120)) of the host computing device (100). Each of the virtual machines may be performing similar or different processes. In one or more embodiments of the invention, the virtual machines provide services to users, e.g., clients (not shown). For example, the virtual machines may host instances of databases, email servers, and/or other applications. The virtual machines may host other types of applications without departing from the invention.

In one or more embodiments of the invention, the host computing device (100) hosts specialized VMs (104). The specialized VMs (104) include functionality to interact with the graphical processing units (GPUs) (126). More specifically, the specialized VMs (104) include computer readable code (e.g., the GPU drivers and other related software components) that enables the specialized VMs to interact with the GPUs based on the Application Program Interfaces (APIs) or communication specifications of the GPUs. The specialized VMs (104) may interact with the components of the hardware layer (120) without using the host OS (110); rather, the specialized VMs may interact with the components of the hardware layer (120) using a communication protocol such as a peripheral component interconnect (PCI) pass-through. In one or more embodiments of the invention, the specialized VMs (104) each include their own operating system (OS) that allows the specialized VMs (104) to perform the aforementioned functionality. The OSes executing in the specialized VMs (104) may be equipped to communicate with an offload component (112) of the host OS (110).

In one or more embodiments of the invention, instead of communicating directly with the GPUs, the specialized VMs (104) may communicate with the GPUs using a hypervisor (not shown). The hypervisor may be an entity that is interposed between the specialized VMs (104) and the offload component (112) of the host OS (110). Further, the hypervisor may be equipped to facilitate communication between the specialized VMs and the GPUs (126) and interface with the specialized VMs (104). Such that each of the specialized VMs (104) may communicate with the GPUs (126) through the hypervisor. Other protocols or communication mechanisms may be used without departing from the invention.

In one embodiment of the invention, the host computing device may include different types of GPUs, where each of the different types of GPUs use different communication protocols and/or have different functionality. In this scenario, the host computing device may include different types of specialized VMs, each type of specialized VMs is able to interact with a specific type of GPU. In such scenarios, the different types of the specialized VMs may be optimized to work with particular types of GPUs. Further, if a new GPU(s) is added to the host computing device, a new or modified specialized VM may be added to the host computing device such that the host computing device can utilize the new GPU.

In one embodiment of the invention, the specialized VMs include functionality to service offload requests (discussed below in FIGS. 2A-2B) in a manner that most efficiently utilizes the GPUs processing capabilities, such as parallel processing.

Figure 2A:
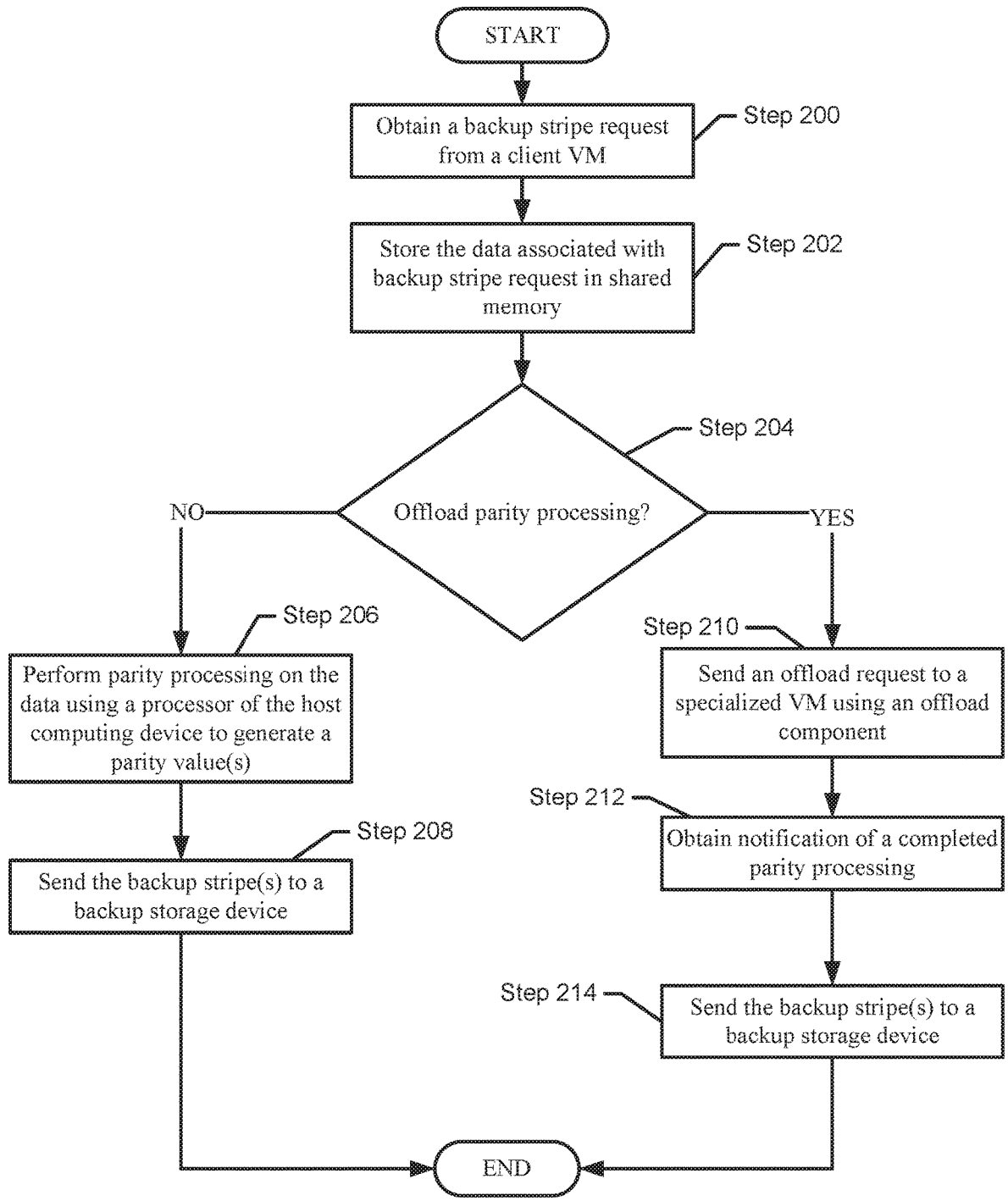
FIG. 2A shows a flowchart for generating backup stripes in accordance with one or more embodiments of the invention.
Figure 2B:
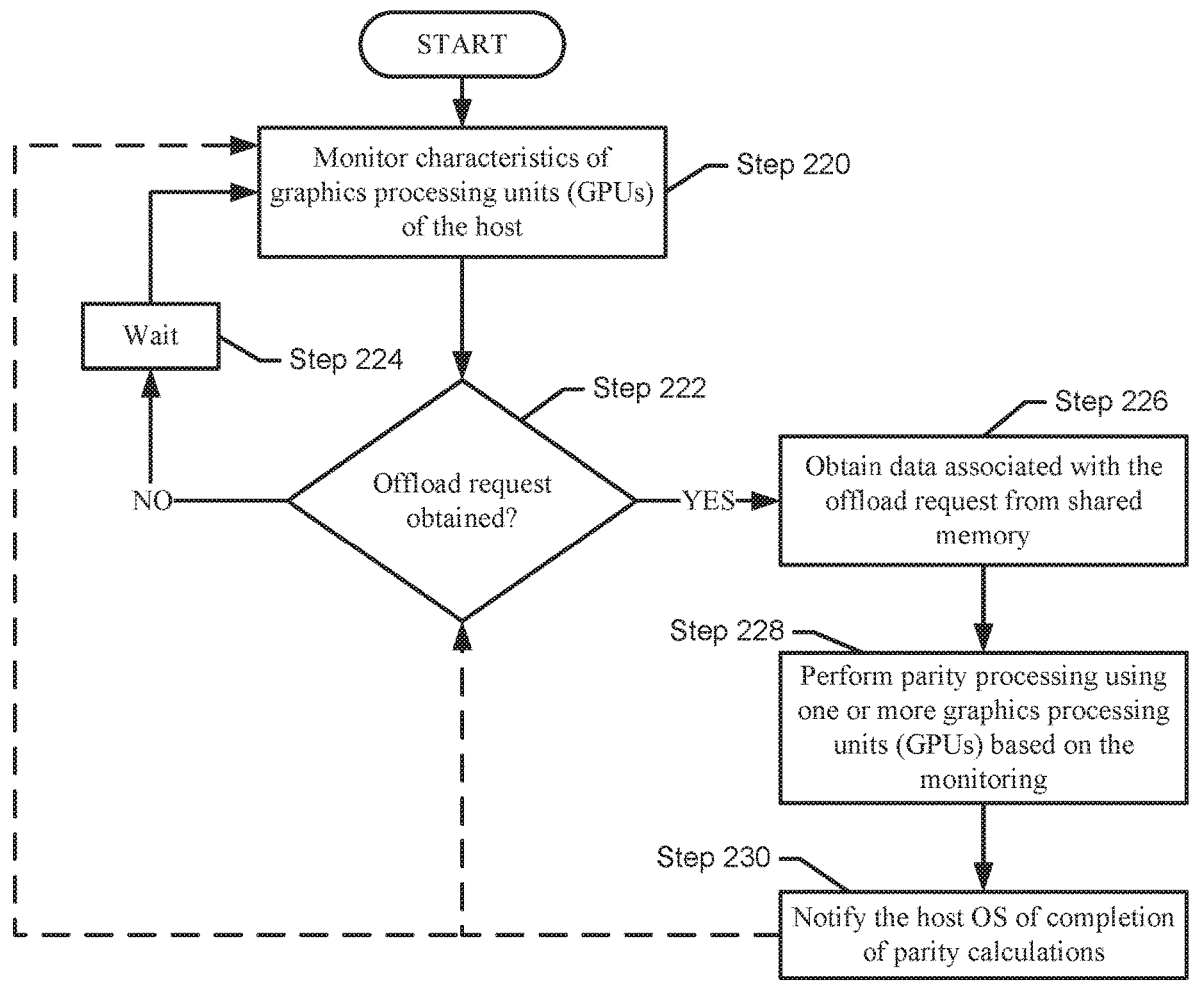
FIG. 2B shows a flowchart for generating backup stripe parity calculations in accordance with one or more embodiments of the invention.

In one or more of embodiments of the invention, the virtual machines (102, 104) are implemented as computer instructions, e.g., computer code, stored on a persistent storage that when executed by a processor(s) (e.g., 122) of the host computing device (100) cause the host computing device (100) to provide the functionality of the virtual machines (102, 104) described throughout this application and/or all, or a portion thereof, of the methods illustrated in FIGS. 2A-2B.

In one or more embodiments of the invention, the hardware layer (120) includes computing resources utilized by components (e.g., the host OS (110), client VMs (102), the specialized VMs (104), and/or the offload component (112)) of the host computing device (100) to perform the functionalities specified by each respective component (or computing resource). The computing resources (or components) may include a processor(s) (122), shared memory (124), and one or more graphics processing units (GPUs) (126). Each computing resource of the hardware layer (120) may be operably connected via any combination of wired connections. Each computing resource of the hardware layer (120) is discussed below.

The processor (122) may be a computing resource that processes information (e.g., data) as requested by a component and sends the processed data to the requested entity. Processing data may include arithmetic calculations, logic processing, and/or other input/output operations without departing from the invention. In one or more embodiments of the invention, the processor (122) is implemented as a central processing unit (CPU) with single-core or multi-core processing capabilities. The processor (122) may be other types of processors without departing from the invention.

The shared memory (124) is volatile memory that may be accessed by two or more components of the host computing device (100). In one or more embodiments of the invention, the shared memory (124) is implemented as, for example, static random access memory (SRAM), dynamic random access memory (DRAM), and/or other types of memory without departing from the invention.

In one or more embodiments of the invention, the processor (122) includes additional memory (not shown) that may be used by the processor when processing data. The additional memory may be separate from the shared memory (124). The additional memory and the shared memory (124) may be operatively connected via a PCI express (PCI-E) bus that facilitates data transfer between the additional memory and the shared memory (124). Other communication mechanisms may be used to transfer data between the various shared memories without departing from the invention.

The GPUs (126) are a type of processor that includes a significantly larger number of cores than the processor (122). The GPUs (126) may utilize the multiple cores to perform a large number of processes in parallel. The processes performed by the GPUs (126) may include basic arithmetic operations. The GPUs may perform additional types of processes without departing from the invention.

In one or more embodiments of the invention, the GPUs (126) include computing resources that allow the GPUs to perform the functions described throughout this application. The computing resources (not shown) within the GPUs may include cache, local memory (e.g., dynamic random access memory (DRAM)), and the cores. The cores may be capable of processing one or more threads (e.g., processes performed on data by a core of the GPU) at a time and temporarily storing data in the cache and/or local memory during the processing.

In one or more embodiments of the invention, the host computing device (100) operates using a host operating system (OS) (110). The host OS (110) is an operating system that manages the operation of the client VMs (102), the specialized VMs (104), and the hardware layer (120). The host OS (110) may service requests obtained from one or more of the client VMs (102). In one or more embodiments of the invention, the host OS (110) services the requests by assigning tasks to the specialized VMs (104) based on the requests. In one or more embodiments of the invention, the host OS (110) services the requests via the method illustrated in FIGS. 2A-2B.

In one or more embodiments of the invention, the host OS (110) is implemented as computer instructions, e.g., computer code, stored on a persistent storage that when executed by a processor(s) (e.g., 122) of the host computing device (100) cause the host computing device (100) to provide the functionality of the host OS (110) described throughout this application.

In one or more embodiments of the invention, the host OS (110) includes an offload component (112) that serves as an interface between the host OS (112) and the specialized VMs (104). The offload component (112) may send requests to one or more of the specialized VMs (104) as specified by the host OS (110). In one or more embodiments of the invention, the offload component is implemented as, for example, an application programming interface (API). The offload component (112) may include functionality that allows the offload component (112) to communicate with operating systems of each of the specialized VMs (104).

In one or more embodiments of the invention, the offload component (112) is implemented as computer instructions, e.g., computer code, stored on a persistent storage that when executed by a processor(s) (e.g., 122) of the host computing device (100) cause the host computing device (100) to provide the functionality of the offload component (112) described throughout this application.

In one or more embodiments of the invention, the backup storage device (150) stores data. The data may be backups, which is protected using parity data. In such cases, the backups may correspond to a set of backup stripes, where each stripe includes a combination of data chunks and parity chunks. The backup storage device may include multiple disks (e.g., hard disk drives, solid state drives, etc.). Each disk may store a portion of the backup stripe. For example, each disk of the backup storage device may store one or more data chunks and/or parity chunks. Additional detail about the backup stripes is provided below.

Figure 4:
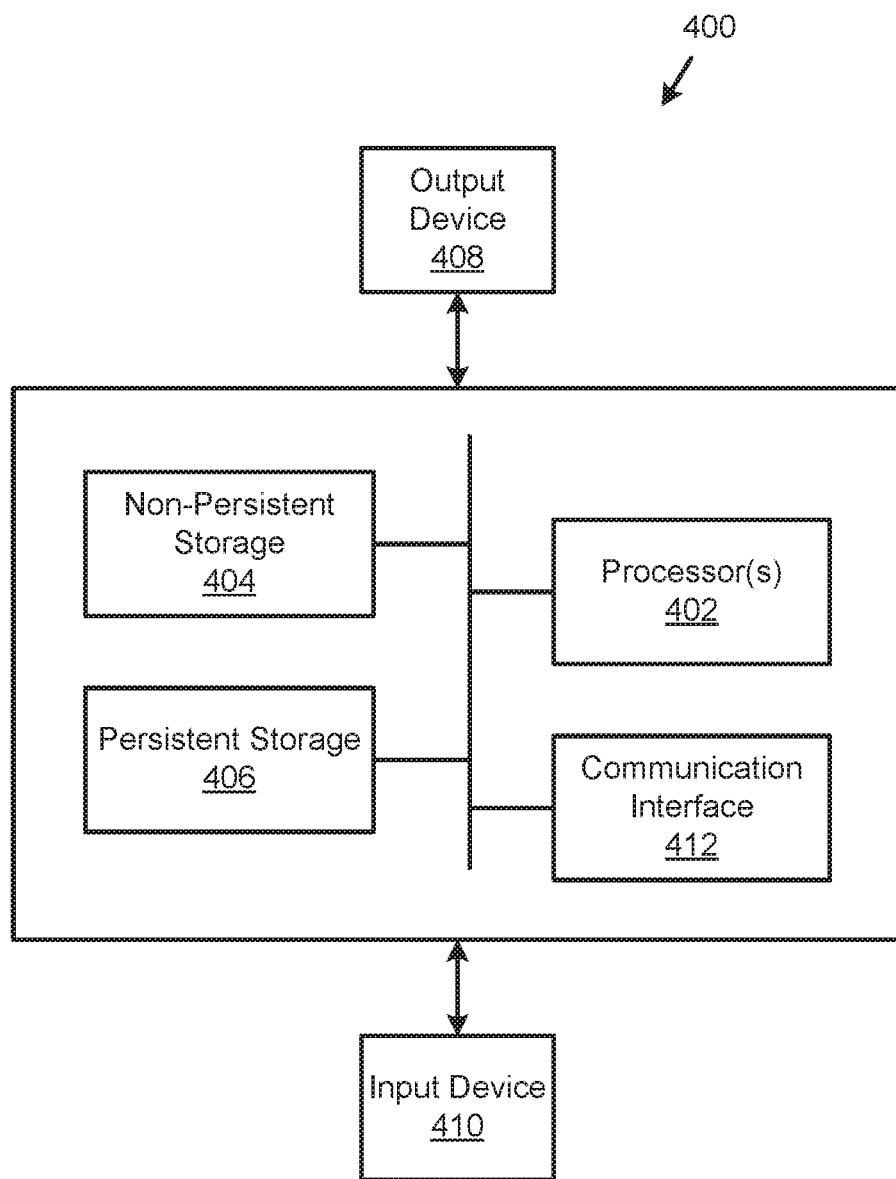
FIG. 4 shows a diagram of a computing device in accordance with one or more embodiments of the invention.

In one or more embodiments of the invention, the backup storage device (150) is implemented as a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup storage device (150) described throughout this application.

In one or more embodiments of the invention, the backup storage device (150) is implemented as a logical device. The logical device may utilize the computing resources of any number of computing devices and thereby provide the functionality of the backup storage device (150) described throughout this application.

In one or more embodiments of the invention, the clients (not shown) that interact with the host computing device may be a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client described throughout this application.

In one or more embodiments of the invention, the client is implemented as a logical device. The logical device may utilize the computing resources of any number of computing devices and thereby provide the functionality of the client described throughout this application.

While FIG. 1 shows the architecture of the host computing device, the invention is not limited to the architecture shown in FIG. 1.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for generating backup stripes in accordance with one or more embodiments of the invention. The method shown in FIG. 2A may be performed by, for example, a host OS (110, FIG. 1). Other components of the system illustrated in FIG. 1 may perform the method of FIG. 2A without departing from the invention.

Turning to FIG. 2A, in step 200, a backup stripe request is obtained. In one or more embodiments of the invention, the backup stripe request is obtained from a client VM. The backup stripe request specifies data that is to be stored in persistent storage using Redundant Array of Independent Disks (RAID) striping. The process of RAID striping may include performing parity calculations (also referred to as parity processing) on all or a portion of the backup stripes to obtain parity values.

In step 202, the data associated with the backup stripe request is stored in shared memory. In one or more embodiments of the invention, the host OS obtains the data from persistent storage and stores the data in shared memory. Once stored, the data may be accessed from the shared memory using one or more references. The references may correspond to a physical or logical address(es) in the shared memory in which the data is stored. In this manner, the data may be accessed by the host OS, by a specialized VM, and/or other components of the host computing device for performing parity processing.

In step 204, a determination is made about whether to offload parity processing. If the host OS offloads parity processing, the method proceeds to step 210; otherwise, the method proceeds to step 206. In one or more embodiments of the invention, the host OS may determine whether to offload the parity processing by identifying an amount of computing resources (e.g., processing and memory) required to complete the parity processing and comparing that amount to an amount of computing resources available to the host OS. If the host OS determines that the amount needed to perform parity processing is greater than the amount available to the host OS, the host OS may determine to offload the parity processing. In one or more embodiments of the invention, the host OS uses other methods to determine whether to offload the parity processing without departing from the invention.

In step 206, parity processing is performed on the data (i.e., the data stored in the shared memory) using a processor of the host computing device to generate a parity value(s). In one or more embodiments of the invention, the parity processing includes dividing the obtained data into portions, referred to as data chunks. The data chunks may then be grouped into subsets of data chunks. One or more parity values are then calculated for each group (or subset) of the data chunks. The number data chunks in a group as well as the number of parity values may vary based on the erasure coding algorithm that is being used as part of the parity processing. Non-limiting examples of erasure coding algorithms are RAID-4, RAID-5, RAID-6, and RAID-7. Other erasing coding algorithms may be used without departing from the invention. For example, if the parity processing being implemented is RAID-4, then a single parity value may be calculated for every three data chunks in a stripe. Continuing with the discussion of FIG. 2A, the resulting parity value is then stored in a parity chunk. The combination of the data chunks and the corresponding parity chunk may be referred to as a backup stripe. If an erasure coding algorithm requires multiple parity values to be calculated, then the multiple parity values are calculated with each parity value being stored in a separate parity chunk.

As discussed above, the data chunks are used to generate parity chunks in accordance with the parity processing. More specifically, the parity chunks may be generated by applying a predetermined function (e.g., P Parity function, Q Parity Function, etc.), operation, or calculation to at least one of the data chunks. Depending on the erasure coding algorithm used, the parity chunks may include, but are not limited to, P parity values and/or Q parity values.

In one embodiment of the invention, the P parity value is a Reed-Solomon syndrome and, as such, the P Parity function may correspond to any function that can generate a Reed-Solomon syndrome. In one embodiment of the invention, the P parity function is an XOR function.

In one embodiment of the invention, the Q parity value is a Reed-Solomon syndrome and, as such, the Q Parity function may correspond to any function that can generate a Reed-Solomon syndrome. In one embodiment of the invention, a Q parity value is a Reed-Solomon code. In one embodiment of the invention, $Q=g_0 \cdot D_0 + g_1 \cdot D_1 + g_2 \cdot D_2 + \ldots + g_{n-1} \cdot D_{n-1}$, where Q corresponds to the Q parity, g is a generator of the field, and the value of D corresponds to the data in the data chunks.

In one or more embodiments of the invention, the number of data chunks and parity chunks generated is determined by the erasure coding algorithm, which may be specified by the host OS, by the specialized VM, and/or by another entity. The parity chunks may be combined (or otherwise grouped) to create backup stripes.

In step 208, the backup stripe(s), which includes the data chunks and the one or more parity chunks, is sent to a backup storage device. In one or more embodiments of the invention, the backup storage device includes a number of disks. The data chunks and the parity chunk(s) are stored in a separate predetermined disk of the backup storage device. The disks in which to store the data chunks and/or parity chunks may be determined by the erasure coding algorithm implemented by the host OS.

Returning to step 204, if a determination is made to offload the parity processing, then in step 210 the host OS sends an offload request to a specialized VM using an offload component. In one or more embodiments of the invention, the offload component obtains the request to offload the parity processing and converts the request to a format readable to the specialized VM. The converted request (i.e., the offload request) may be subsequently sent to the specialized VM. In one or more embodiments of the invention, the specialized VM performs the parity processing via the method illustrated in FIG. 2B. The specialized VM may perform the parity processing via other methods without departing from the invention.

In step 212, after the specialized VM has serviced the offload request, a notification of the completed parity processing is obtained. In one or more embodiments of the invention, the notification is obtained from the specialized VM. The offload component may convert the notification to a readable format for the host OS. The notification may include a reference (e.g., a logical or physical address) for each data chunk and parity value that is associated with parity processing stored in the shared memory. The references may be used by the host OS when retrieving the corresponding data chunks and backup chunks.

In step 214, the backup stripe(s) is sent to a backup storage device. In one or more embodiments of the invention, the host OS utilizes computing resources (e.g., a processor) of the hardware layer of the host computing device to generate and send the backup stripe(s) to the backup storage device. For example, the host OS identifies which data chunks and parity chunks to include in each backup stripe and then retrieves the identified chunks (data and parity) to generate a backup stripe, the backup stripe is then transmitted to the backup storage device.

In one or more embodiments of the invention, the backup storage device includes a number of disks. The backup stripes are divided into the data chunks and parity chunks, with each data chunk and/or parity chunk stored in a separate predetermined disk of the backup storage device. The disks in which to store the data chunks and/or parity chunks may be determined by the erasure coding algorithm implemented by the specialized VM.

FIG. 2B shows a flowchart for generating backup stripe parity calculations in accordance with one or more embodiments of the invention. The method shown in FIG. 2B may be performed by, for example, a specialized VM (104, FIG. 1). Other components of the system illustrated in FIG. 1 may perform the method of FIG. 2B without departing from the invention.

In step 220, characteristics of graphics processing units (GPUs) of the host computing device are monitored. In one or more embodiments of the invention, the characteristics are monitored using performance information of each identified processing core of the GPUs. The performance information may specify parameters of the GPUs. The parameters may include hardware parameters and operating parameters.

In one or more embodiments of the invention, a hardware parameter specifies a physical characteristic of a GPU. A hardware parameter of a GPU may include, for example, a number of functional processing cores, GPU-local memory, and any interfaces between the processing cores and other physical components of the host computing device (i.e., the shared memory). The hardware parameters may include additional and/or different information without departing from the invention. The hardware parameters are stored by the specialized VM.

In one or more embodiments of the invention, an operating parameter of a GPU may be a parameter that specifies a processing capability of the physical components of the GPU. The processing capability may be specified by, for example, a processing speed, the current availability of the identified processing cores (i.e., the use of the identified processing cores), clock cycles, and/or other characteristics without departing from the invention. The operating parameters are stored by the specialized VM.

In one or more embodiments of the invention, the specialized VM may periodically perform tests on the GPUs to update the operating parameters. The tests may include, for example, sending a request to process a predetermined amount of data and recording the time taken to perform the requested task. The GPUs may also be periodically polled to determine the current processing load on the GPU.

Continuing with the discussion of FIG. 2B. in step 222, a determination is made about whether an offload request is obtained. If an offload request is obtained, the method proceeds to step 226; otherwise, the method proceeds to step 224.

In step 224, the specialized VM waits for a period to time. The specialized VM may wait until the period of time expires and then proceed back to step 220. However, if an offload request is received during the aforementioned period of time, then the process may proceed to step 226. Further, in the scenario, while step 220 is shown as being performed sequentially prior to steps 222, 226, 228, and 230, steps 222, 226, 228, and 230 may be performed in parallel to step 220 such that the specialized VMs are continuously/periodically obtaining updated operating parameters from the GPUs while at the same time processing the received offload requests.

Continuing with the discussion of FIG. 2B. in step 226, data associated with the offload request is obtained from shared memory. In one or more embodiments of the invention, the data is obtained using references specified in the offload request.

In step 228, parity processing is performed using one or more graphics processing units (GPUs). In one or more embodiments of the invention, the parity processing includes the specialized VM sending instructions to the GPUs for processing data stored in shared memory. The instructions may each include a logical and/or physical address(es) that specify a location(s) of the data in the shared memory. The GPUs may use the logical and/or physical address(es) to obtain the data.

The GPUs, following the instructions, may group the data chunks associated with the backup request into groups and perform a parity processing on the grouped data chunks to obtain a result. The result may be one or more parity values. As discussed above, the grouping of the data chunks and the number of parity values obtained may be based on the erasure coding algorithm that is being used as part of the parity processing. The result (e.g., a parity value(s)) may be stored in shared memory.

In one or more embodiments of the invention, the instructions for performing the parity processing are based on the monitoring performed on the GPUs. See e.g., FIG. 2B, Step 220. The specialized VMs use the information obtained from the monitoring to determine which GPU(s) to use to perform the parity processing. The processing requests may be sent to one or more specific GPUs based on the analysis of the monitored characteristics. For example, a GPU with a larger number of functional processing cores that are not currently being used may perform a larger portion of the parity processing than a GPU with fewer functional processing cores. In another example, a GPU supports a greater level of parallelization may be used over a GPU that supports a relatively lower level of parallelization.

In step 230, a notification is sent to the host OS of completion of parity processing. In one or more embodiments of the invention, the specialized VM store the calculated parity values (e.g., in the form of parity chunks) in the shared memory. The specialized VM subsequently sends a notification to the host that the parity processing is complete. The notification may include addresses (logical or otherwise) that specify the data chunks and related parity chunks stored in the shared memory.

In one embodiment of the invention, the GPUs may also be used to perform parity processing as part of regenerating at least one data chunk in a corrupted backup stripe. In such scenarios, a backup stripe (which includes data chunks and a parity chunk(s)) is obtained from storage and temporarily stored in the shared memory. A determination may then be made, e.g., by the host OS that at least one data chunk in the backup stripe is corrupted. This determination may be made using, e.g., an error corroding code (ECC) or another mechanism, which may be used to determine whether the data chunk is corrupted. Once a determination is made that a given data chunk is corrupted, a recovery request may be sent (via the offload component) to a specialized VM. The specialized VM may select a GPU(s) based on the monitored characteristics (see e.g., FIG. 2B) and then issue a request to the GPU to use the parity value(s) in the backup stripe to regenerate the corrupted data chunk. The regenerated data chunk (which is not corrupted) is stored in the shared memory. The Host OS may obtain the regenerated data chunk from the shared memory and then subsequently provide it (along with the other data chunks from the backup stripe) to the client VM.

Following step 230, the process may end, proceed to step 220, or proceed to step 222.

Example

Figure 3:
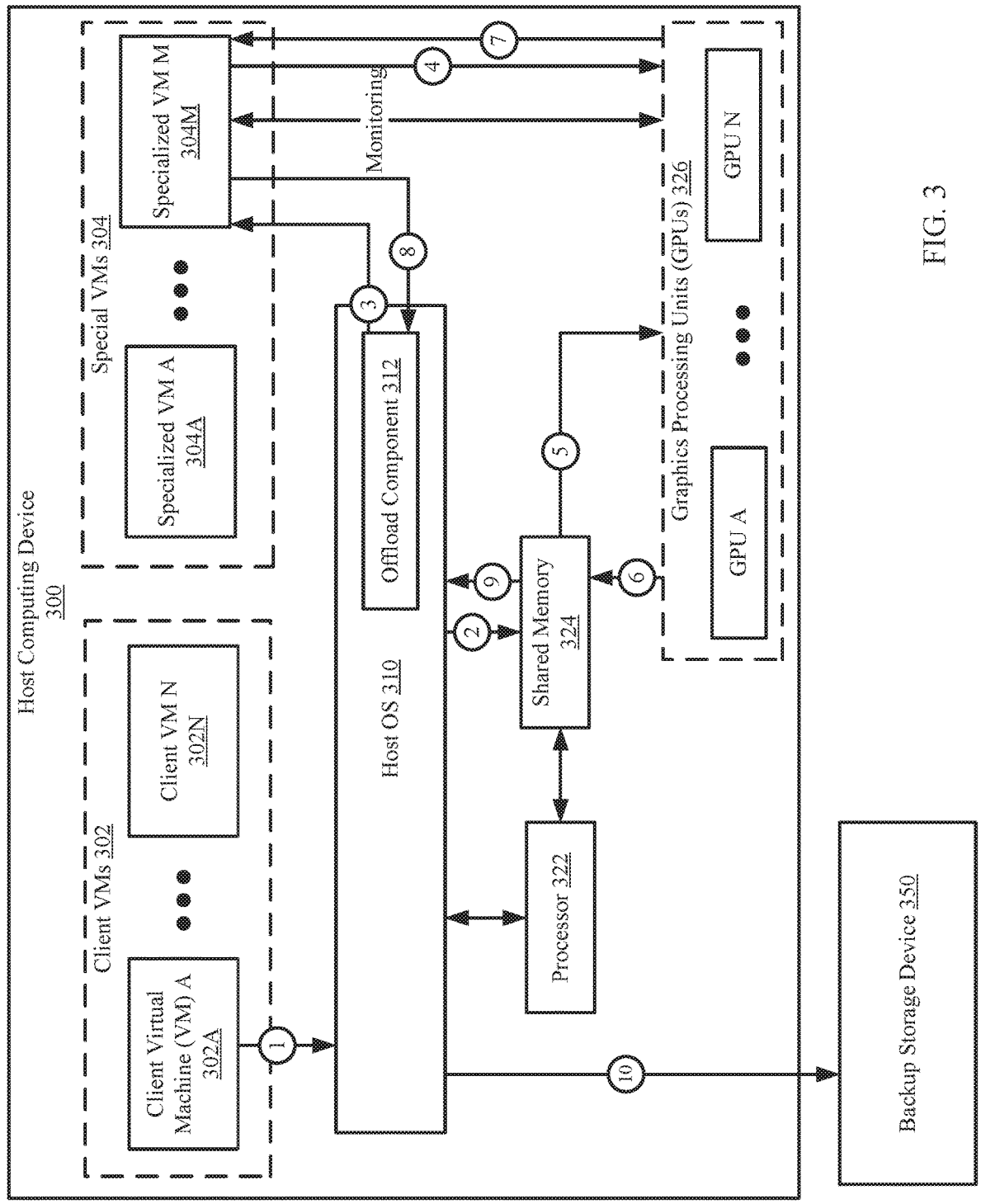
FIG. 3 shows an example in accordance with one or more embodiments of the invention.

The following section describes an example. The example, illustrated in FIG. 3, is not intended to limit the invention. Turning to the example, consider a scenario in which a client VM (302A) requests a backup stored in the backup storage (350) to be protected using RAID. The host computing device (300) may perform actions (labeled in FIG. 3 using numbered circles) based on the methods of FIGS. 2A-2B. The actions are described below.

The client VM (302A) sends a backup stripe request to the host OS (310) [1]. The host OS (310) stores data associated with the backup stripe request in shared memory (324) [2]. The host OS (310), after obtaining the backup stripe request, performs the method of FIG. 2A to determine that it should offload the parity processing. The host OS (310) subsequently offloads the parity processing by using an offload component (312) to send an offload request to a specialized VM (304M) to perform parity processing [3].

At a prior point in time, the specialized VM monitors characteristics of GPUs (326) to identify performance capabilities of the GPUs (326). The specialized VM (304M) may use the performance capabilities to identify the GPUs (326) capable of performing the parity calculations after obtaining the offload request. The specialized VM (304) may send instructions to the GPUs (326) for performing the parity calculations [4]. The instructions may include references to the data that the GPUs (326) may use as input for the parity processing. The GPUs (326) may obtain the aforementioned data using the references and implement an erasure coding algorithm (e.g., RAID-7) when calculating the parity values [5].

After completing the parity calculations, the GPUs (326) store the parity values in the shared memory (324) [6]. The GPUs may notify the specialized VM (304M) of the completed parity processing [7]. The specialized VM (304M) may notify the host OS (310) of completed parity processing

[8]. The notification may include logical addresses in which the data (also referred to as data chunks) and the associated parity value(s) (which may be referred to a parity chunks) are stored in the shared memory (324). The host OS (310) may use the addresses obtain the data chunks and parity chunk(s), collectively referred to as a backup stripe [9]. The host OS may store the backup stripe in the backup storage device (350) based on the erasure coding algorithm implemented [10]. More specifically, the erasure coding algorithm may specify the disks of the backup storage device (350) in which to store the data chunks and parity chunk(s).

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the delegation of performing specific operations during a backup procedure by a computing device with multiple processors each with varying capabilities.

A computing device may include a processor (e.g., a CPU) that may be suited to perform a portion of operations of a backup procedure that involves a small number of complex computations. The backup procedure may include performing large numbers of simple, arithmetic calculations. Embodiments of the invention may offload the large number of simple calculations to graphics processing units. Because the GPUs include a larger number of processing cores compared to a CPU, the GPU may be suited to more efficiently complete the larger number of simple calculations.

Thus, embodiments of the invention may address the problem of inefficient use of computing resources. This problem arises due to the technological nature of the environment in which backup policies are implemented.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for processing data, the method comprising:
   monitoring, by a virtual machine (VM), a plurality of computing resources;
   receiving an offload request by the VM, wherein the offload request is obtained from an offload component executing in a host operating system;
   selecting, based on the monitoring, a computing resource from the plurality of computing resources;
   issuing, by the VM and in response to the offload request, a processing request to the computing resource, wherein the processing request comprises a reference to data;
   servicing, by the computing resource, the processing request,
      wherein the computing resource is a graphics processing unit (GPU) and servicing the processing request comprises:
      obtaining the data from shared memory using the reference to the data;
      generating a result using the data, wherein the result is a parity value; and
      storing the result in the shared memory;
   obtaining, by the host operating system, the result from the shared memory;
   combining the result with the data to obtain an updated result;
   providing the updated result to an external computing device,
      wherein the VM, the host operating system, and the plurality of computing resources are executing on a computing device, and
      wherein the VM interacts with the computing resources of the computing device without using the host operating system.

2. The method of claim 1, wherein the offload request is issued in response to a client request issued by a second VM executing on the host operating system.

3. The method of claim 1, wherein monitoring comprises obtaining a hardware parameter or an operating parameter for each of the plurality of computing resources.

4. A system, comprising:
   a processor;
   a shared memory;
   a plurality of computing resources;
   memory comprising instructions, which when executed by the processor, perform a method, the method comprising:
      monitoring, by a virtual machine (VM) executing on the processor, the plurality of computing resources;
      receiving an offload request by the VM, wherein the offload request is obtained from an offload component executing in a host operating system;
      selecting, based on the monitoring, a computing resource from the plurality of computing resources;
      issuing, by the VM and in response to the offload request, a processing request to the computing resource, wherein the processing request comprises a reference to data;
      servicing, by the computing resource, the processing request, wherein the computing resource is a graphics processing unit (GPU) and servicing the processing request comprises:
         obtaining the data from the shared memory using the reference to the data;
         generating a result using the data, wherein the result is a parity value; and
         storing the result in the shared memory;
      obtaining, by the host operating system, the result from the shared memory;
      combining the result with the data to obtain an updated result; and
      providing the updated result to an external computing device,
      wherein the VM interacts with the computing resources of the computing device without using the host operating system.

5. The system of claim 4, wherein the offload request is issued in response to a client request issued by a second VM executing on the host operating system.

6. The system of claim 4, wherein monitoring comprises obtaining a hardware parameter or an operating parameter for each of the plurality of computing resources.

7. A non-transitory computer readable medium comprising computer readable program code, which when executed by a computer processor enables the computer processor to perform a method, the method comprising:
   monitoring, by a virtual machine (VM), a plurality of computing resources;
   receiving an offload request by the VM, wherein the offload request is obtained from an offload component executing in a host operating system;
   selecting, based on the monitoring, a computing resource from the plurality of computing resources;
   issuing, by the VM and in response to the offload request, a processing request to the computing resource, wherein the processing request comprises a reference to data;
   servicing, by the computing resource, the processing request,
      wherein the computing resource is a graphics processing unit (GPU) and servicing the processing request comprises:
      obtaining the data from a shared memory using the reference to the data;
      generating a result using the data, wherein the result is a parity value; and
      storing the result in the shared memory;
   obtaining, by the host operating system, the result from the shared memory;
   combining the result with the data to obtain an updated result;
   providing the updated result to an external computing device,
   wherein the VM, the host operating system, and the plurality of computing resources are executing on a computing device, and
   wherein the VM interacts with the computing resources of the computing device without using the host operating system.

* * * * *